United States Patent
Bala et al.

(10) Patent No.: US 9,058,757 B2
(45) Date of Patent: Jun. 16, 2015

(54) SYSTEMS AND METHODS FOR IMAGE OR VIDEO PERSONALIZATION WITH SELECTABLE EFFECTS

(75) Inventors: Raja Bala, Pittsford, NY (US); Hengzhou Ding, Webster, NY (US); Michael R. Furst, Penfield, NY (US); Reuven J. Sherwin, Raanana (IL)

(73) Assignee: XEROX CORPORATION, Norwalk, CT (US)

( * ) Notice: Subject to any disclaimer, the term of this patent is extended or adjusted under 35 U.S.C. 154(b) by 179 days.

(21) Appl. No.: 13/584,159

(22) Filed: Aug. 13, 2012

(65) Prior Publication Data
US 2014/0043363 A1 Feb. 13, 2014

(51) Int. Cl.
G09G 5/00 (2006.01)
G06T 11/60 (2006.01)

(52) U.S. Cl.
CPC .......... *G09G 5/00* (2013.01); *G09G 2340/0492* (2013.01); *G09G 2340/10* (2013.01); *G09G 2340/12* (2013.01); *G09G 2340/125* (2013.01); *G09G 2340/14* (2013.01); *G06T 11/60* (2013.01)

(58) Field of Classification Search
CPC .............. G09G 2340/125; G09G 5/00; G09G 2340/14; G09G 2340/0492; G09G 2340/12; G09G 2340/10; G01C 21/22; G01C 21/367; G06F 1/1601; G06F 1/1616; G06T 11/60
See application file for complete search history.

(56) References Cited

U.S. PATENT DOCUMENTS

| | | | |
|---|---|---|---|
| 6,097,853 A * | 8/2000 | Gu et al. | 382/282 |
| 2008/0019576 A1* | 1/2008 | Senftner et al. | 382/118 |
| 2010/0061695 A1* | 3/2010 | Furmanski et al. | 386/52 |
| 2010/0156919 A1 | 6/2010 | Bala et al. | |
| 2011/0064388 A1* | 3/2011 | Brown et al. | 386/285 |
| 2011/0225610 A1* | 9/2011 | Prieto | 725/38 |
| 2012/0032948 A1* | 2/2012 | Lowe et al. | 345/419 |
| 2012/0146991 A1 | 6/2012 | Bala et al. | |
| 2012/0293687 A1* | 11/2012 | Karn et al. | 348/231.99 |

OTHER PUBLICATIONS

Bala et al., "Methods and System for Analyzing and Rating Images for Personalization", U.S. Appl. No. 13/349,751, filed Jan. 13, 2012.
Bala et al., "Finding Text in Natural Scenes", U.S. Appl. No. 13/494,173, filed Jun. 12, 2012.

* cited by examiner

*Primary Examiner* — Maurice L McDowell, Jr.
(74) *Attorney, Agent, or Firm* — MH2 Technology Law Group LLP

(57) ABSTRACT

Embodiments relate to systems and methods for image or video personalization with selectable effects. Image data, which can include video sequences or digital still images, can be received in a graphical personalization tool to perform various image processing and related operations to insert personalized objects into the image data. In aspects, the personalized object(s) can be or include graphical inputs such as, for instance, textual information, graphical information, and/or other visual objects. The graphical personalization tool can automatically perform one or more processing stages in the image path, such as identifying key regions in a still image and/or key frames in a video sequence, in which personalized objects will be generated and inserted. Personalized objects can be extended to additional regions of a still image, can be animated across multiple still images, and/or can be extended to additional frames of a video sequence, all on an automated or user-assisted basis.

23 Claims, 3 Drawing Sheets

SYSTEMS AND METHODS FOR IMAGE OR VIDEO PERSONALIZATION WITH SELECTABLE EFFECTS

FIELD

The present teachings relate to systems and methods for image or video personalization with selectable effects, and more particularly, to platforms and techniques for providing automated tools to assist a user in generating, editing, and inserting personalized graphical objects into digital still images or video sequences, by identifying key areas or key frames in the original image data and supporting the image processing of the personalized objects for insertion.

BACKGROUND

In video, Web media, and other areas, the use of image processing and/or video production tools is known. In applications such as personal video production, or others such as commercial advertising and other production, the ability to generate and insert graphical objects into a video sequence or graphical still image has been known. Such applications can be useful for producing specialized or personalized advertising content, such as video segments which incorporate the names, products or services of interest, and/or other information relevant to individual users, or groups of users.

However, in known media production tools, the features and functions available to produce personalized graphical objects can be cumbersome and technical, and impose a significant amount of ramp-up time on the part of the inexperienced user. Commercial-grade and similar video and graphical tools can require the user to learn how to manually discover, locate, identify, and manipulate image source data. The user typically then must manually insert, adjust, format the personalized objects they wish to enter into a video sequence or still image, and make corresponding compensations to the color, perspective, and other attributes of an image or frame they wish to modify with personalized content.

It is thus desirable to provide methods and systems for image or video personalization with selectable effects, in which the identification of key regions or frames of still images or video sequences can, if desired, be automatically performed for the user, and in which image adjustment and other surrounding tasks can be automated and/or assisted via an automated graphical personalization tool which does not require extensive background knowledge or application training, while also providing high-quality personalization effects.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for image or video personalization with selectable effects. More particularly, embodiments relate to platforms and techniques for accessing video or still image source data, analyzing the content of that image data, discovering key regions or key frames of that data for potential personalization operations, and accepting user-inputted graphical objects to modify that image data to reflect content of interest to the user or groups of users. In aspects, the complement of image processing features and resources used to perform those and other operations can be integrated in a graphical personalization tool that can receive user-specified video sequences, animations, digital still images, and/or other image data, for instance, from personal computer storage, cameras, online services, and/or other hosts or sources. The graphical personalization tool can be configured to locate, within the image data, suitable frames or regions in which to insert of modify personalized graphical objects, such as personalized text, symbols, image inserts, and/or other objects selected and/or edited by the user. The graphical personalization tool can likewise perform automated operations on the one or more objects provided or edited by the user, such as, for instance, to alter the perspective on the personalized objects or image data on the whole, change the size, font, color characteristics, and/or other attributes of the personalized object or data in order to produce a realistic effect, and prepare the image data containing those inserted objects for printing, display, and/or other output.

Reference will now be made in detail to exemplary embodiments of the present teachings, which are illustrated in the accompanying drawings. Where possible the same reference numbers will be used throughout the drawings to refer to the same or like parts.

Figure 1:
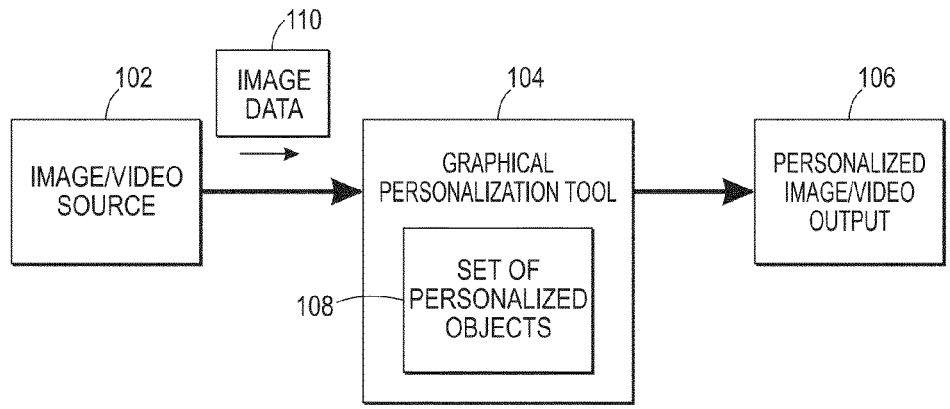
FIG. 1 illustrates an overall system configuration that can be used in systems and methods for image or video personalization with selectable effects, according to various embodiments.

FIG. 1 illustrates an overall system configuration in which systems and methods for image or video personalization with selectable effects can operate, according to aspects. In aspects as shown, an image source 102 can produce, transmit, encode, and/or store image data 110, wherein image data refers to still images or video sequences. In aspects, the image source 102 can be or include, for instance, an imaging device and/or store such as a digital camera, smartphone camera, video camera, a scanner, a computer such as a desktop, laptop, and/or server computer, and/or other device, platform, service, and/or hardware. In aspects, the image source 102 can generate, host, store, and/or maintain the image data 110 in local or remote storage, such as hard disk storage, optical storage, electronic memory, and/or other types of storage hardware or media. According to aspects, the image data 110 can be an image file encoded, for example, in a comparatively high-resolution and/or high-color palette (e.g., 24- or 32-bit) format. The image data 110 can be encoded, merely for example, in an RGB color space, or CIELAB (luminance-chrominance) format or color space specified in the International Commission on Illumination (CIE) 1976 color space standard. In aspects, the image data 110 can be encoded in other formats or according to other standards, such as the TIFF (Tagged Image File Format), the RAW file format, JPEG format, MP4 format, and/or others. According to aspects, as noted the image source 102 can be or include a device which captures and initially encodes or stores the image data 110, but can also be or include a device or service which receives and stores the image data 110 from one or more other sources, such as, for instance, an online digital video and/or photo storage site or service.

In aspects, the image source 102 can communicate with a graphical personalization tool 104 to receive, analyze, manipulate, and/or personalize the image data 110 to generate personalized image/video output 106, which can be or include the original image data tailored to include specialized or personalized textual, graphical, and/or other content. In aspects, the graphical personalization tool 104 can be or include computer and/or other hardware resources such as a desktop, laptop, server, and/or other computer, and/or a smartphone or other networked digital device. In aspects, the graphical personalization tool 104 can also or instead be or include software and/or service resources, such as applications, operating systems, online portals or services, and/or other software-based logic or services.

According to aspects, a user can operate the graphical personalization tool 104, locally or remotely, to generate, edit, and/or insert a set of personalized objects 108 into the image data 110, and thereby create a specialized, personalized, and/or otherwise customized version of the image data 110 represented by the personalized output 106. In aspects, and merely for example, the personalized output 106 can include content such as personal names, business names, the logos of preferred products or services, advertisements or other promotions, indicators of geographic location, and/or other types or classes of content or information that can serve to render the image data 110 more personalized or relevant to a specific user, and/or groups of users. Moreover, and as described herein, the graphical personalization tool 104 can automatically perform a variety of image processing tasks to accomplish the insertion of the personalized objects 108 into the output 106, and/or can support and assist the user of the graphical personalization tool 104 in doing so.

Figure 2:
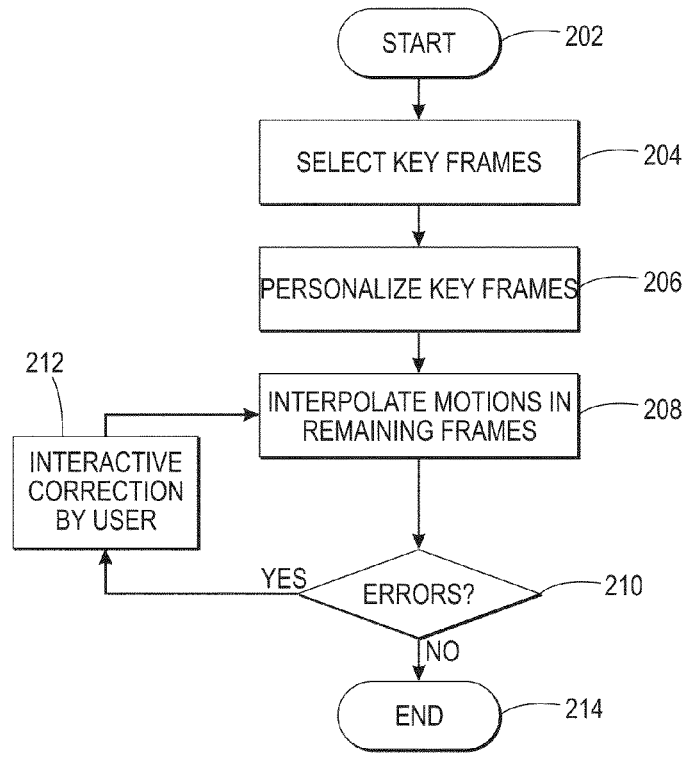
FIG. 2 illustrates a flowchart of processing that can be used in systems and methods for image or video personalization with selectable effects, according to various embodiments.

More specifically and as for instance illustrated in the flowchart of FIG. 2, the graphical personalization tool 104 can be operated to perform a set of tasks on the image data 110 to manipulate personalized content, and eventually generate the personalized output 106. In aspects as shown, processing can begin in 202. In 204, the graphical personalization tool 104 can select or identify one or more keys frames in the image data 110. In implementations, the graphical personalization tool 104 can select or identify one or more keys frames, on an automated basis. In aspects, one or more key frames can be identified, found, analyzed, or selected based on detected features of the frame, such as large smooth regions, regions of a specific texture, linear edges, planar surfaces, existing text, specific motion characteristics such as global linear motion, and/or others. In implementations, the graphical personalization tool 104 can select or identify one or more key frames in the image 110 based on user input or selection, such as user review and input of a selected frame or frames to be used as key frame(s), and/or as a template or exemplar for additional key frames. In aspects, the user can select and/or input one or more objects in the set of personalized objects 108 in the select key frame or frames. In 208, the graphical personalization tool 104 can interpolate motions in remaining frames other than the selected key frames. In aspects, for instance, if a user has selected, generated, and/or inserted a selection of text to be placed on a wall in a room or on the side of a vehicle, that text can be made to move and/or change position or perspective in additional frames of the image data 110.

In 210, the graphical personalization tool 104 can query the user to identify any errors in the appearance of the personalized objects 108 as interpolated and/or inserted into additional frames or sections of the image data 110. If the user responds by indicating that an error or inaccuracy exists in the set of personalized objects 108 inserted in the image data 110, he/she is given the ability to correct the object appearance within the tool, and processing can return to 208, where motion vectors and/or other features are interpolated to produce realistic object appearance in remaining frames of the image data 110. In 210, if the user does not identify or indicate any errors in the set of personalized objects 108 inserted in the image data 110, processing can proceed to 214, and end. At or after 214, processing can also or instead repeat, return to a prior processing point, or jump to a further processing point, besides terminating.

In terms of carrying out operations on the image data 110 when that data is, or includes, video frames or sequences, a number of techniques can be used to generate and manage the set of personalized objects 108 for that application, while exploiting features of video data, including temporal redundancy, that can provide increased efficiencies in image processing of that type of content. In general, and as for instance shown in FIG. 3, an original frame in the image data 110 can be discovered, located, identified, and/or selected as a key frame for personalization operations. That frame can be presented to the user with original and/or updated personalized information as part of a set of personalized objects 108, illustratively shown as "My Text" located on the side of a moving vehicle. The set of personalized objects 108 reflected in that key frame can be presented to the user via the graphical personalization tool 104, for the user to view and provide any corrective inputs, if they wish. After receiving any corrections, edits, and/or updates from the user, the graphical personalization tool 104 can propagate the updated or correct set of personalized objects 108 to frames located before the selected key frame and/or after the key frame, to generate a set of updated image data 110 that incorporates the set of personalized objects 108 in all appropriate frames. In illustrative examples as shown, that propagated set of objects can include an inserted "My Text" message in frames containing the same or similar vehicle, setting, and/or object as the key frame. In aspects, the inserted "My Text" content can be inserted with corresponding adjustments to perspective, size, font, color, and/or other features to reflect the motion and/or animation being conveyed in the video sequence. If for example in the video sequence in FIG. 3 the truck is moving along the road, then the "My Text" object will automatically move with the truck, producing a natural appearance.

In terms of discovering, locating, identifying, and/or selecting a key frame or frames in which the set of personalized objects 108 can be inserted and from there propagated to other frames, as noted more than one technique can be used. In aspects, it may be noted that not all frames of a video sequence as part of the image data 110 need be analyzed for purposes of incorporating personalized content. In aspects, one or more key frames can be identified that are particularly strong or suitable candidates for personalization, and which represent one or a variety of contextual scenes. The remainder of the frames of the video sequence, and/or subsets of the remainder, can then be personalized based on the key frame or frames, using techniques described herein.

Discovering, identifying, and/or selecting the key frame or frames themselves can involve analyzing the frames and/or scenes, and determining regions of interests. In implementations, the regions of interest can be or include surfaces in the foreground that can capture a viewer's attention. In aspects, planar surfaces can be used, but it will be appreciated that other surfaces can be used, including cylindrical surfaces (such as, e.g., bottles, cans, and/or other objects having a cylindrical and/or concave surface). In aspects, incorporation of the set of personalized objects 108 can include the addition of new textual and/or other content onto a plain surface, and/or replacement of existing content on the surface, such as replacing the signage on a moving truck or other surface.

In implementations as noted, one technique to achieve or assist in key frame identification is to prompt the user to make the selection and/or identification. In various regards, the use of user-selected input for key frame identification can be highly effective, since the user is likely to know or have a sense where the user wishes to place the personalized text and/or other personalized content. In cases, if the video data as part or all of the image data 110 is originally captured with the intent of later incorporating personalized content, the key frame or frames may already be pre-identified. Once regions of interest are identified, the corresponding frames can in aspects be marked up as key frames.

In implementations, a selection approach that can be used in addition or instead of user selection is to configure the selection based on the Motion Pictures Experts Group (MPEG) format, and/or metadata surround the MPEG data, when the image data 110 is, or contains, information encoded in MPEG format. In aspects, frames are designated as "I" frames in MPEG format. The designated "I" frames in an MPEG video sequence can serve as key frames, in part because the "I" frames are independently compressed frames, and in addition, usually are used to indicated the start of a new scene in the video sequence. While the "I" frames are noted, it will be appreciated that other MPEG-based frames, and/or other frames having desirable attributes for use as key frames, can be used.

In implementations, a further selection approach that can be used in addition to, or instead of, the foregoing is to automatically analyze the video frames contained in the image data 110, and compute a predefined metric or measure which can be used as part of the key frame selection criteria. In aspects, such a metric can be or include a suitability for personalization (SFP) metric, as described in U.S. patent application Ser. No. 13/349,751, filed Jan. 13, 2012, entitled "METHODS AND SYSTEM FOR ANALYZING AND RATING IMAGES FOR PERSONALIZATION", by Bala et al. (hereinafter "U.S. application No. Ser. 13/349,751"), which is incorporated herein by reference in its entirety. As noted in U.S. application Ser. No. 13/349,751, the SFP metric analyzes the image data 110, identifies all regions that are spatially smooth or containing existing text as candidate regions suitable or eligible for personalization, and subsequently derives a score indicating how suitable the frame and/or image is for personalization. Those frames with high SFP metric values or scores can be selected as key frames. The SFP metric can be adapted to search for dominant text in a scene, for example based on character size, motion trajectory, and/or other attributes. The SFP metric can likewise or instead be adapted to search for a specific text string in the video data, to be systematically replaced by a personalized message. Due to computational loads that can be associated with the SFP metric, a subset of key frames, such as the "I" frames in MPEG video data and relatively small numbers of frames in between, can be selected for analysis by the SFP metric.

According to further implementations, since each key frame from a set of video data contained in or comprising the image data 110 is itself a still image, approaches that are directed to still image personalization can also or instead be used for those selected frames. Still image personalization techniques, for instance, described in U.S. patent application Ser. No. 12/340,103, filed Dec. 19, 2008, entitled "SYSTEMS AND METHODS FOR TEXT-BASED PERSONALIZATION OF IMAGES", by Bala et al., now US Publication No. 2010/0156919, published Jun. 24, 2010 (hereinafter "US Publication No. 2010/0156919") and U.S. patent application Ser. No. 12/964,820, filed Dec. 10, 2010, entitled "RENDERING PERSONALIZED TEXT ON CURVED IMAGE SURFACES", by Bala et al., now US Publication No. 2012/0146991, published Jun. 14, 2012 (hereinafter US Publication No. 2012/0146991"), which are incorporated herein in their entirety, can be used for those purposes. In approaches of those types, the graphical personalization tool 104 can present a key frame to the user through a graphical user interface (GUI), and interrogate the user to select a region to insert and/or replace text within the selected frame. As an alternative or complementary step, the graphical personalization tool 104 can automatically suggest suitable or candidate inclusion and/or exclusion regions for text insertion or replacement, using known object recognition and/or other techniques. The graphical personalization tool 104 can then detect features such as straight lines, elliptical curves, and/or others around the boundary of the identified region, followed by an initial estimation of the surface geometry, which can be computed and presented to the user. In aspects, the user can then make iterative adjustments, edits, and/or corrections to the key frame, region, and/or inserted content, as part of the set of personalized objects 108. The text and/or other content that is ultimately selected can then be rendered, for instance, in three-dimensional (3D) format using estimated surface geometry.

In addition, in implementations the personalization of key frames in video data can be assisted by analyzing the following and/or adjacent frames. If the key frame in the image data 110 is blurred due to handshake during video camera capture, fast motion, and/or other causes, the feature detection carried out in the key frame may be of poor quality. In these regards, it may be useful to select a subsequent video frame which exhibits greater sharpness as the key frame, yielding better feature detection results. The detected features in the subsequent frame can then be back-tracked to the initial key frame, using a feature matching algorithm and/or other techniques.

According to aspects, once all selected key frames have been personalized as described above, the remaining frames in the image data 110 can be personalized efficiently using a motion vector analysis in the vicinity of the selected region to approximate the motion of the set of personalized objects 108, including any text, in subsequent frames. To increase the accuracy of motion-vector based motion approximation, a feature detection and tracking algorithm can be computed around the region in subsequent frames. This can serve as a verification step and correct any mistakes resulting from inaccurate estimates of motion vectors.

According to implementation, in addition to or instead of feature detection algorithms noted above to correct motion and/or perspective the graphical personalization tool 104 can request the user to make corrections in a "proofing" mode. In aspects employing this approach, the user can be presented with a graphical interface where the user can view the personalized video reflected in the personalized output 106, and mark or identify those frames in which the appearance of the set of personalized objects 108 is noticeably incorrect or inaccurate. In aspects, the corrective processing can be seen in FIG. 3, in which the user can identify an error in perspective in the frame shown on the left (labeled "original frame"). The user can then be given a set of interface options to perform a correction. The interface options can include, for instance, an ability to drag the four corners of the text, to give the text the correct perspective on a planar surface, as shown in that figure. After processing the corrected perspective, the graphical personalization tool 104 can produced the corrected frame including the set of personalized objects 108, as shown in the frame on the right (labeled "user-corrected frame"). In aspects, an interpolation algorithm can then be invoked or initiated to propagate the correction into adjacent frames.

Figure 3:
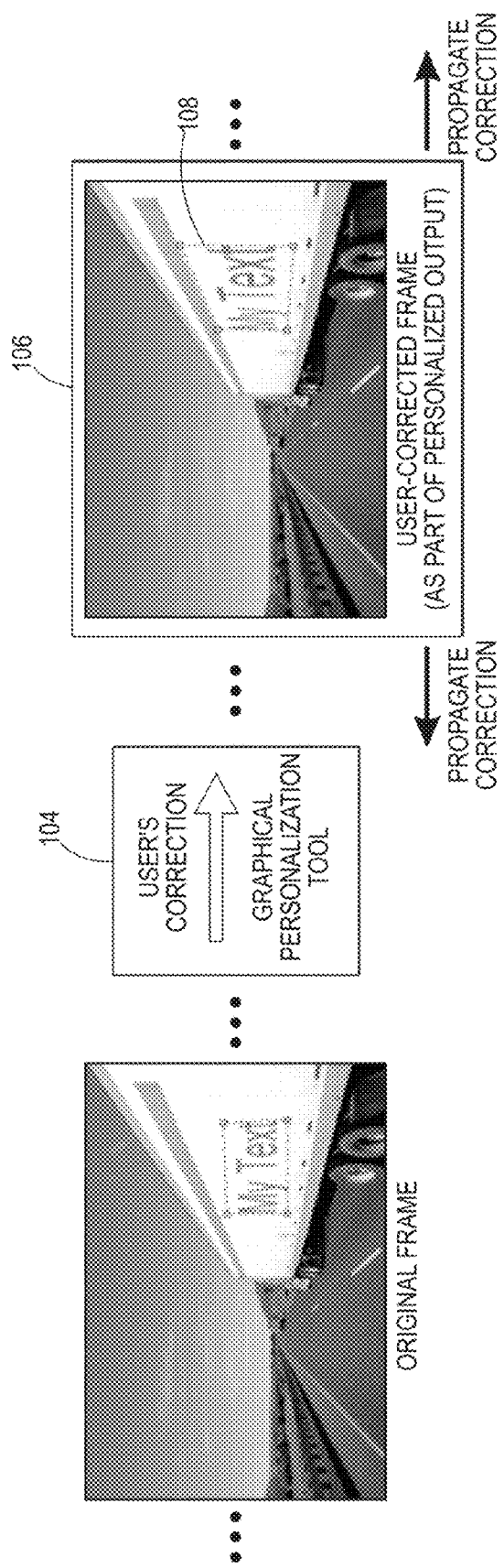
FIG. 3 illustrates exemplary image processing operations and output, using video sequence data, according to various embodiments.

According to aspects, it may be noted that systems and methods for image or video personalization with selectable effects, including personalization of video-based content as illustrated in FIGS. 2 and 3, can find application in various video fields, including commercial marketing and political campaigns, but can be used in other applications as well. The inventive platforms and techniques can be used, for example, in personalized medial video applications, where an individual's video scan (e.g., Red Green Blue (RGB), ultrasound, magnetic resonance imaging (MRI), etc.) can be used as the background and/or a template video. In such applications, the set of personalized objects 108 such as text, graphics, and/or images pertaining to a body part, function, and/or condition for a specific patient can be incorporated in a relatively seamless manner into the video content. Other applications are possible.

Figure 4A:
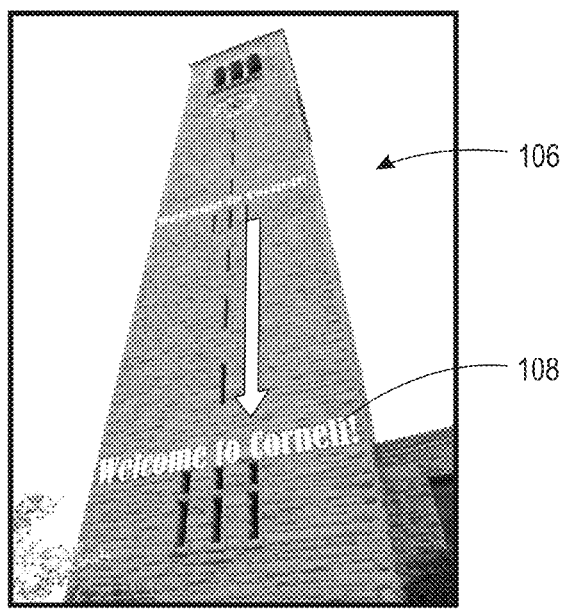
FIG. 4 illustrates exemplary image processing operations and output, using digital still image data, according to various embodiments.
Figure 4B:
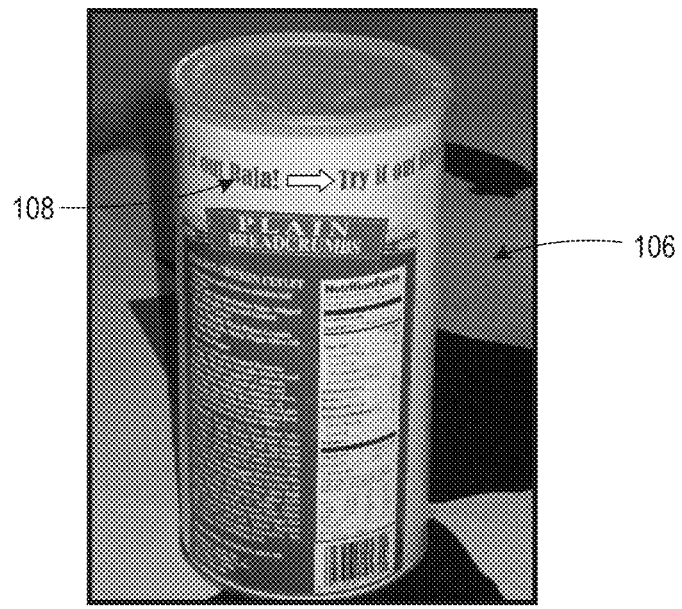

According to aspects, besides being configured to operate on video data to insert personalized content, the graphical personalization tool 104 can also or instead be configured to process still image data, to generate an animated and/or otherwise modified still image sequence which presents the set of personalized objects 108, with a motion-like effect. As for instance shown in FIGS. 4A and 4B, the user can select or access a still image as the source image data 110. In implementations in such regards, the user can operate the graphical personalization tool 104 to insert a set of personalized objects 108 into the still image, and present the still image as a constant or fixed background while the set of personalized objects 108 can be made to exhibit motion, via animation effects such as text moving on a road or wall. These types of animation effects are illustrated in FIGS. 4A and 4B, in which a user's inserted text ("Welcome to Cornell" in FIG. 4A and "Try it out Raja!" in FIG. 4B), is generated and presented on a flat or cylindrical surface respectively, and then shown as moving along that surface, as indicated by the arrow in each figure. In aspects, the text can be caused to not only move on the surface, but also to perform other transformations, such as to change its size, rotate on the surface, change colors, and/or other effects, simultaneously with the text motion. In implementations, techniques described in the aforementioned US Publication No. 2010/0156919 and US Publication No. 2012/0146991 can be used in text rendering operations, in which a three-dimensional (3D) pinhole camera model can allow the user to move the text freely around the planar, cylindrical, and/or other surface. It will be appreciated that other text rendering techniques can be used. The user can thus specify a motion path for the set of personalized objects 108 including text inserts, and have that text and/or other objects recorded in an animation layer incorporated in the personalized output 106. It may be noted that as long as the three-dimensional geometry and rendering parameters can be estimated from the image data 110, any type of complex motion along the given surface can be specified. It may be noted that the personalized output 106 generated in this fashion can be encoded, recorded, and/or supported by or in standard formats such as Adobe Flash™ animations and/or animated GIF (graphical interchange format) data or files, or others. Such personalized output 106 can be useful in applications such as, merely by example, electronic greeting cards, electronic advertisements, medical videos, and others.

According to aspects, various implementations described above related to personalizing video content and personalizing still image content can be combined. For instance, in implementations the graphical personalization tool 104 can be configured to incorporated personalized movies and/or animations within an existing video. To perform such personalization, the perspective geometry and motion of the region within the template video must be correctly estimated and tracked over time, to produce the personalized output 106. In further implementations, the concept of chroma-keying can be used, in which a scene being captured is purposely designed so that the region and/or object to be personalized exhibits a known fixed property, such as color and/or texture. This can cause the region-identification and tracking operations to become easier or more convenient, and can also permit layering and occlusion effects to be incorporated. Examples of the latter include, for instance, the depiction of people walking in front of a moving truck with a personalized image or sign.

Various hardware, software, and other resources can be used in implementations of image or video personalization with selectable effects, according to embodiments. In embodiments, the graphical personalization tool 104 can comprise a platform including processor communicating with memory, such as electronic random access memory, operating under control of or in conjunction with an operating system. The processor in embodiments can be incorporated in one or more servers, clusters, and/or other computers or hardware resources, and/or can be implemented using cloud-based resources. The operating system can be, for example, a distribution of the Linux™ operating system, the Unix™ operating system, or other open-source or proprietary operating system or platform. The processor can communicate with data storage, such as a database stored on a local hard drive or drive array, to access or the image data 110 and/or other content, media, or other data. The processor can in implementations further communicate with a network interface, such as an Ethernet or wireless data connection, which in turn communicates with one or more networks, such as the Internet or other public or private networks. In implementations, the image data 110 and/or other data can be received and/or accessed by the graphical personalization tool 104 via the noted one or more networks. The processor can, in general, be programmed or configured to execute control logic and control language processing operations, including to access, retrieve, manipulate, edit, and store the image data 110, the set of personalized objects 108, and/or the personalized output 106, among other data or outputs. Other configurations of the graphical personalization tool 104, associated network connections, and other hardware, software, and service resources are possible.

The foregoing description is illustrative, and variations in configuration and implementation may occur to persons skilled in the art. For example, while embodiments have been illustrated or described in which the graphical personalization tool 104 is implemented or incorporated in one hardware and/or software module or resource, in implementations, the graphical personalization tool 104 can be implemented or incorporated across or in multiple hardware and/or software modules or resources, such as for example in a cloud architecture. Those hardware and/or software modules or resources can be local or distributed. Similarly, while embodiments have been illustrated or described in which one or more of the set of personalized objects 108 are inserted in one key frame or key area of the image data 110, in aspects, the set of personalized objects 108, and/or multiple sets of personalized objects 106, can be inserted or incorporated in multiple areas of one image or video frame, and/or in multiple images or video frames. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of producing personalized image data for rendering on a display device, comprising:
    accessing image data from an image source, wherein the image data comprises a sequence of image frames;
    automatically identifying a key image frame of the sequence of image frames, based on smooth region finding operations, detected regions of a specific texture, detected planar surfaces, detected text, or detected specific motion characters;
    receiving, via user input, at least one personalized object for insertion into the image data;
    inserting the at least one personalized object into the key image frame to produce personalized output image data wherein at least one of the original image data and the personalized object exhibits motion;
    extending the incorporation of the at least one personalized object to additional image frames of the image data;
    interpolating motion vectors to determine the location and appearance of the at least one personalized object for the additional image frames;
    subsequent to interpolating the motion vectors, querying a user to identify any errors in the location or the appearance of the at least one personalized object for the additional image frames;
    in response to the querying, receiving user correction input to adjust the location or the appearance of the at least one personalized object for the additional image frames; and
    interpolating motion vectors to determine the location and appearance of the at least one personalized object for the additional image frames based on the user correction input.

2. The method of claim 1, wherein the at least one personalized object comprises at least one of image, graphics, text, or video.

3. The method of claim 1, wherein receiving the at least one personalized object comprises performing an image adjustment operation on the at least one personalized object to produce a desired realistic effect.

4. The method of claim 3, wherein the image adjustment operation comprises at least one of performing a perspective adjustment, a contrast adjustment, or a sizing adjustment of the at least one personalized object.

5. The method of claim 1, wherein receiving the personalized object comprises receiving user correction input to adjust the at least one personalized object.

6. The method of claim 5, wherein the adjustment is made to at least one of perspective, location, size, contrast, or color of the personalized object.

7. The method of claim 1, further comprising receiving a set of exemplar personalized objects to present to the user for selecting the at least one personalized object.

8. The method of claim 1, wherein the display device comprises at least one of a desktop computer, laptop computer, smartphone, or tablet.

9. The method of claim 1, wherein identifying the key image frame of the sequence of image frames is further based on edge detection operations.

10. The method of claim 1, wherein querying the user to identify any errors in the location or the appearance of the at least one personalized object for the additional image frames comprises presenting a graphical interface where the user can view the personalized output image data and identify specific frames in which the location or the appearance of the at least one personalized object is incorrect.

11. The method of claim 10, wherein the graphical interface allows the user to drag corners of the at least one personalized object to give the text a correct perspective on a planar surface.

12. A system, comprising:
    an interface to an image source providing image data; and
    a processor, communicating with the image source via the interface, the processor being configured to—
        access the image data from the image source, wherein the image data comprises a sequence of image frames,
        automatically identify a key image frame of the sequence of image frames, based on smooth region finding operations, detected regions of a specific texture, detected planar surfaces, detected text, or detected specific motion characters,
        receive, via user input, at least one personalized object for insertion into the image data,
        insert the at least one personalized object into the key image frame to produce personalized output image data wherein at least one of the original image data and the personalized object exhibits motion,
        extending the incorporation of the at least one personalized object to additional image frames of the image data;
        interpolating motion vectors to determine the location and appearance of the at least one personalized object for the additional image frames;
        subsequent to interpolating the motion vectors, querying a user to identify any errors in the location or the appearance of the at least one personalized object for the additional image frames;
        in response to the querying, receiving user correction input to adjust the location or the appearance of the at least one personalized object for the additional image frames; and
        interpolating motion vectors to determine the location and appearance of the at least one personalized object for the additional image frames based on the user correction input.

13. The system of claim 12, wherein the at least one personalized object comprises at least one of graphics, text, or video.

14. The system of claim 12, wherein receiving the at least one personalized object comprises performing an image adjustment operation on the at least one personalized object to produce a desired realistic effect.

15. The system of claim 14, wherein the image adjustment operation comprises at least one of performing a perspective adjustment, a contrast adjustment, or a sizing adjustment of the at least one personalized object.

16. The system of claim 12, wherein receiving the personalized object comprises receiving user correction input to adjust the at least one personalized object.

17. The system of claim 16, wherein the adjustment is made to at least one of perspective, location, size, contrast, or color of the personalized object.

18. The system of claim 12, wherein the processor is further configured to receive a set of exemplar personalized objects to present for user selection as the at least one personalized object.

19. The system of claim 12, further comprising a display device for display of the personalized output image data.

20. The system of claim 19, wherein the display device comprises at least one of a desktop computer, laptop computer, smartphone, or tablet.

21. The system of claim 12, wherein identifying the key image frame of the sequence of image frames is further based on edge detection operations.

22. The system of claim 12, wherein querying the user to identify any errors in the location or the appearance of the at least one personalized object for the additional image frames comprises presenting a graphical interface where the user can view the personalized output image data and identify specific frames in which the location or the appearance of the at least one personalized object is incorrect.

23. The system of claim 22, wherein the graphical interface allows the user to drag corners of the at least one personalized object to give the text a correct perspective on a planar surface.

* * * * *